(12) United States Patent
Kroczek et al.

(10) Patent No.: US 12,540,688 B2
(45) Date of Patent: Feb. 3, 2026

(54) FLUSH VALVE POSITION DETECTION

(71) Applicant: B/E Aerospace, Inc., Winston-Salem, NC (US)

(72) Inventors: Piotr Jacek Kroczek, Nieciszów (PL); Paweł Świrniak, Wrocław (PL); Krzysztof Słomiany, Jerzmanowice (PL)

(73) Assignee: B/E AEROSPACE, INC., Winstom Salem, NC (US)

( * ) Notice: Subject to any disclaimer, the term of this patent is extended or adjusted under 35 U.S.C. 154(b) by 108 days.

(21) Appl. No.: 18/677,695

(22) Filed: May 29, 2024

(65) Prior Publication Data
US 2025/0003523 A1 Jan. 2, 2025

(30) Foreign Application Priority Data

Jun. 28, 2023 (EP) ..................................... 23461614

(51) Int. Cl.
*E03D 3/10* (2006.01)
*F16K 31/04* (2006.01)
*F16K 37/00* (2006.01)

(52) U.S. Cl.
CPC ............ *F16K 37/0058* (2013.01); *E03D 3/10* (2013.01); *F16K 31/047* (2013.01)

(58) Field of Classification Search
CPC ........ E03D 11/10; E03D 3/10; F16K 37/0058
See application file for complete search history.

(56) References Cited

U.S. PATENT DOCUMENTS

| 5,056,046 A | * | 10/1991 | Mutchler | ................. G01D 5/39 137/551 |
| 6,152,173 A | * | 11/2000 | Makowan | ............... F16K 15/03 137/553 |
| 6,370,709 B1 | * | 4/2002 | Stradinger | .............. E03F 1/006 4/434 |
| 8,272,281 B2 | * | 9/2012 | McCarty | ............. F16K 37/0041 73/865.9 |

(Continued)

FOREIGN PATENT DOCUMENTS

| CN | 103245371 | 8/2013 |
| CN | 104596774 | 5/2015 |

(Continued)

OTHER PUBLICATIONS

European Patent Office; European Search Report dated Dec. 11, 2023 in Application No. 23461614.2.

*Primary Examiner* — David P Angwin
*Assistant Examiner* — Nicholas A Ros
(74) *Attorney, Agent, or Firm* — SNELL & WILMER L.L.P.

(57) ABSTRACT

A flush valve comprising: a valve housing defining a port; and a valve plate arranged to rotate in a plane, relative to the port, such as to vary a degree of coverage of the port by the valve plate depending on the rotational position of the plate; the flush valve further comprising: a component that rotates with the valve plate; a code formed of gradated markings provided on the component, the gradated markings formed such that a characteristic of the code varies across the component in the rotation direction; and a code reader, fixed relative to the valve housing, and positioned to read the code as it passes the code reader on rotation of the valve plate.

14 Claims, 3 Drawing Sheets

(56) References Cited

U.S. PATENT DOCUMENTS

| | | | |
|---|---|---|---|
| 9,618,136 B2 * | 4/2017 | Bell | ................ F16K 37/0041 |
| 2002/0120982 A1 | 9/2002 | Stradinger et al. | |
| 2007/0262029 A1 | 11/2007 | Yoshida et al. | |

FOREIGN PATENT DOCUMENTS

| | | | | |
|---|---|---|---|---|
| CN | 106022199 | | 10/2016 | |
| CN | 115046015 | | 9/2022 | |
| EP | 1601590 | | 4/2012 | |
| EP | 3277578 | * | 6/2024 | ............ E03D 11/16 |
| JP | H0666598 | | 3/1994 | |
| WO | 2020191288 | | 9/2020 | |

* cited by examiner

1. Step Open (Position):

2. Step Between (Position) 30 degree flap angle rotation

3. Step Between (position) 60 degree flap angle rotation

4. Step Closed (positon):

FLUSH VALVE POSITION DETECTION

CROSS-REFERENCE TO RELATED APPLICATIONS

This application claims priority to and the benefit of EP patent application Ser. No. 23461614.2 filed Jun. 28, 2023 and titled "FLUSH VALVE POSITION DETECTION," which is incorporated by reference herein in its entirety for all purposes.

FIELD

The present disclosure is concerned with detecting the position of a flush valve in a vacuum toilet.

BACKGROUND

Vacuum toilets find use in a number of areas, including in vehicles such as aircraft, trains, ships etc. In such toilets, waste is removed from the toilet bowl by means of a vacuum that draws the waste into a waste line leading to a waste tank or other disposal location. Vacuum toilets use a flush plate valve comprising a moveable plate between the toilet bowl and the waste line, the plate being moved between a closed position where it blocks flow from the bowl to the waste line, and an open position where a flow path is provided from the bowl to the waste line, so that waste can be suctioned from the bowl into the waste line. A known flush valve has a plate that is rotated about a mounting point, by an electric motor, via a gear mechanism, from the open (flushing) position to the closed position. It is important to know the position of the flush valve plate. At the very least, the motor and flush control systems need to know whether the plate is in the open or the closed position, and conventionally this has been monitored by means of various types of switches. It is preferable, however, to be able to more accurately detect the position of the plate not only at the open and closed positions, but also between those positions. Some vacuum flush valves use potentiometers to detect the plate position from the gear mechanism position and to cause the motor to start/stop based on the detected position. The position of the potentiometer must, however, be accurately tuned, for each assembly, at the time of assembly, which adds to the manufacture time of the flush valve and the tuning can, if slightly inaccurate, lead to problems during use. Inaccuracies can lead to the valve not closing fully or, alternatively, trying to close further after it is actually fully closed, which can cause damage and/or propagate position errors. Position detection arrangements should be accurate, but also lightweight, simple and inexpensive and should be capable of operating reliably in the harsh environment of a vacuum toilet where contaminants and water are present, as well as high pressure differentials and, often, high temperature variations. Vacuum toilets are also often used in high-vibrational environments and so any position detection mechanism also needs to be robust in such environments.

SUMMARY

The present disclosure provides a flush valve comprising: a valve housing defining a port; and a valve plate arranged to rotate in a plane, relative to the port, such as to vary a degree of coverage of the port by the valve plate depending on the rotational position of the plate; the flush valve further comprising: a component that rotates with the valve plate; a code formed of gradated markings provided on the component, the gradated markings formed such that a characteristic of the code varies across the component in the rotation direction; and a code reader, fixed relative to the valve housing, and positioned to read the code as it passes the code reader on rotation of the valve plate.

A vacuum toilet with such a flush valve is also provided.

BRIEF DESCRIPTION OF THE DRAWINGS

Examples of the flush valve position detection arrangement according to this disclosure will now be described with reference to the drawings. It should be noted that these are examples only and variations are possible within the scope of the claims.

DETAILED DESCRIPTION

Figure 1:
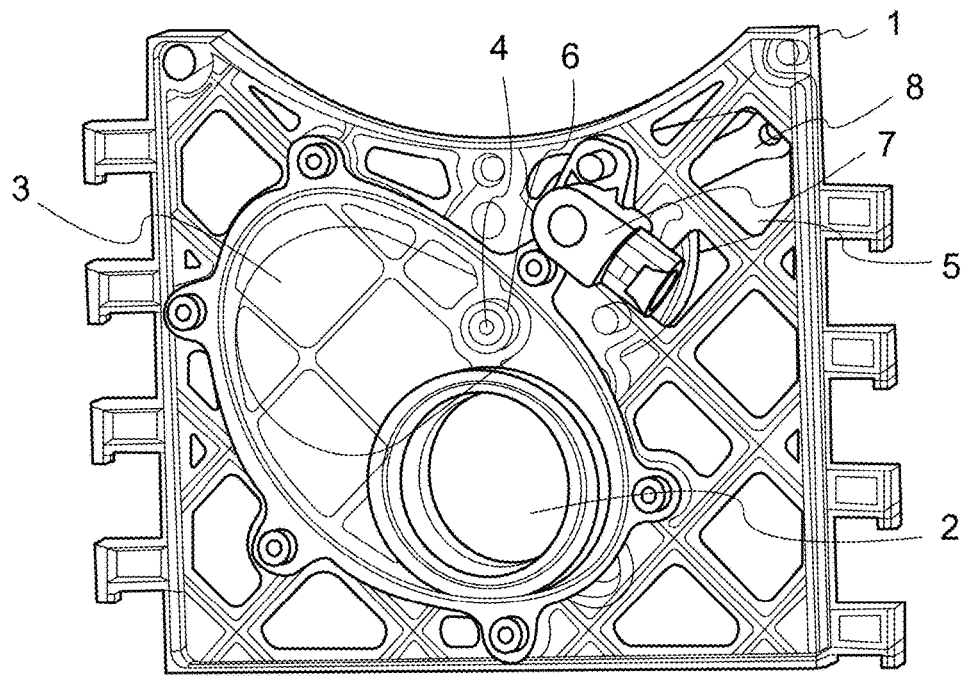
FIG. 1 shows a flush valve assembly using a conventional potentiometer-based position detection arrangement.

A typical flush valve arrangement will be described first with reference to FIG. 1. The valve is, in use, to be arranged between a toilet bowl and a waste pipe. The valve has a valve housing 1 for mounting the valve in position, and a port 2 which, when the valve is mounted in position, will be located between a drain outlet of the toilet bowl and the waste or sewage line leading to a waste tank or the like. During flushing, waste is suctioned from the toilet bowl, through the port 2 into the waste line. Neither the toilet bowl nor the waste line is shown here since the use and location of such a flush valve is known to those skilled in the art. The valve also includes a movable plate 3 which is arranged to rotate or pivot about a pivot point 4, relative to the housing 1 and the port 2 between an open position in which the plate 3 does not cover the port, to allow waste to flow from the bowl to the waste line through the port during flushing, to a closed position (not shown) in which the plate covers the port 2 to prevent flow of waste from the bowl to the waste line. FIG. 1 shows the plate 3 in an almost fully open position. In the example shown, the port is circular and the plate has a corresponding shape such that in the closed position, it fully covers the port and in the fully open position, it does not overlap with the port. In such examples, therefore, the rounded part of the plate is ideally the same shape, but slightly larger than the port, having an attachment portion where the plate is fastened to the housing at the pivot point 4.

Movement of the plate 3 between the open and closed positions is typically by an electric motor (not shown) which rotates a drive shaft 5, the drive shaft being connected via a gear mechanism 6 to a plate shaft 51 to which the plate 3 is attached, to rotate the plate 3. Again, this will not be described further, since such mechanisms are known to those of skill in the art and different, also know, plate driving mechanisms may also be used.

To ensure accurate operation of the motor to drive the valve, it is important to accurately and reliably detect the position of the plate relative to the port—i.e. its rotary position about the pivot point 4.

In the conventional arrangement shown in FIG. 1, a potentiometer 7 is used to detect rotation of the gears 6 as an indication of the position of the plate rotated by the gears.

The potentiometer 7 sends a signal to the motor controller (not shown) to control the motor to stop/start based on the detected position of the plate.

A handle 8 may also be provided for manual operation of the valve if needed (e.g. in the case of failure of the electric motor).

Figure 2:
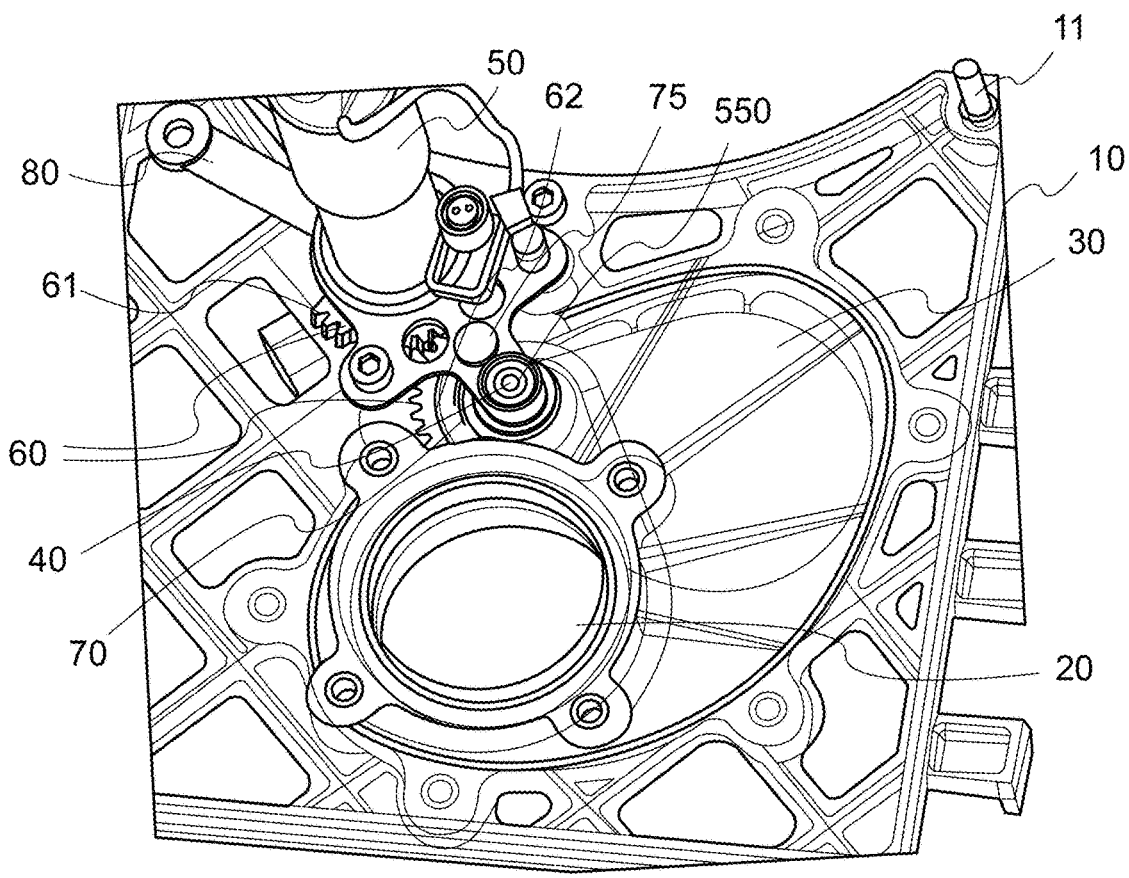
FIG. 2 shows a flush valve assembly with a position detection arrangement according to the disclosure.

A flush valve position detection arrangement according to the disclosure, which overcomes the above-described disadvantages of using potentiometers for position detection of the valve plate, will now be described with reference to the remaining figures. The main components of the valve assembly itself—the housing, the port and the plate are as in conventional valves and the arrangement of this disclosure will be described with reference to valve of a design similar to that of FIG. 1. FIG. 2 shows the valve from the opposite side to FIG. 1.

As described above for FIG. 1, the valve assembly of this example has a valve housing 10 arranged to be fitted between the toilet bowl (not shown) and the waste line (not shown). The valve may be secured in place by e.g. screws 11 or other fittings. A valve port 20 is located, when the valve is fitted, between a waste outlet of the toilet bowl and the waste line. The valve plate 30 is, as with the arrangement of FIG. 1, arranged on a plate shaft 550 to be pivoted about a pivot point 40. The plate shaft 550 is rotated, via a gear mechanism 60 by rotation of the motor drive shaft 50 by the electric motor (not shown).

The gear mechanism 60 includes a first gear wheel 61 connected to and rotatable with the motor drive shaft 50, which meshes with a second gear wheel 62 which is connected to the plate shaft 550.

As with the system of FIG. 1, the arrangement may also have a handle 80 for manual operation of the valve.

In the example shown, the port 20 and valve plate 30 are the same as shown in FIG. 1. It is, however, possible to vary the shape and size of the port and/or plate as required and still use the concepts of this disclosure for position detection.

The position detection arrangement according to this disclosure comprises position detection markings 70, 70', 70" or gradations (described hereinafter as a 'bar code' for convenience, but intended to cover a wide range of markings with properties or characteristics that change across the range of rotation of the bar code) provided on the plate shaft gear 62, as well as a code reader 75 arranged to read the bar code as it passes the code reader on rotation of the plate shaft 550 and, hence, the plate 30. In one example, the code reader 75 is a scanner such as a CCD sensor or a laser but other known code readers may also be used. The code reader 75 is fixed relative to the valve housing and reads the markings on the plate shaft gear 550 as they rotate past the reader during movement of the plate. Due to the markings varying across the gear 62 in the rotational direction, characteristics of the marking picked up by the reader will provide an indication of the rotary position of the gear 62 and, therefore, of the plate shaft 550 and the plate 30. The code reader 75 can then send signals indicative of the detected position to the motor controller to control operation of the motor.

Figure 3C:
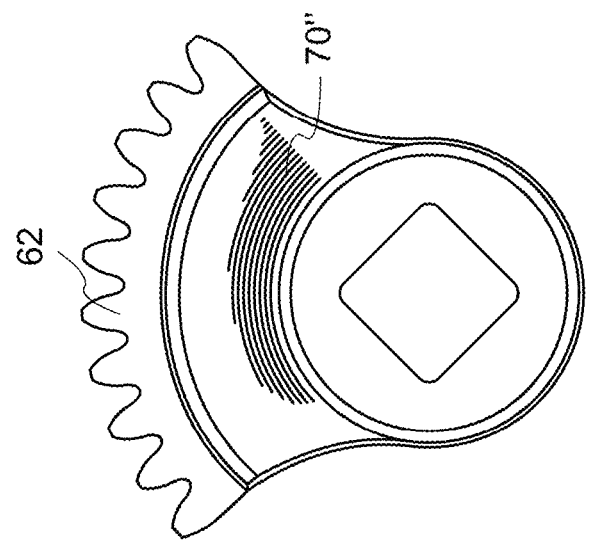
FIGS. 3A to 3C shows examples of the position detection arrangement according to the disclosure.
Figure 3B:
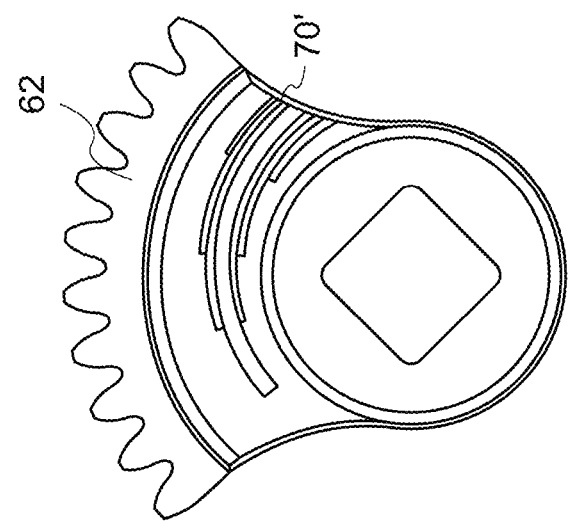
Figure 3A:
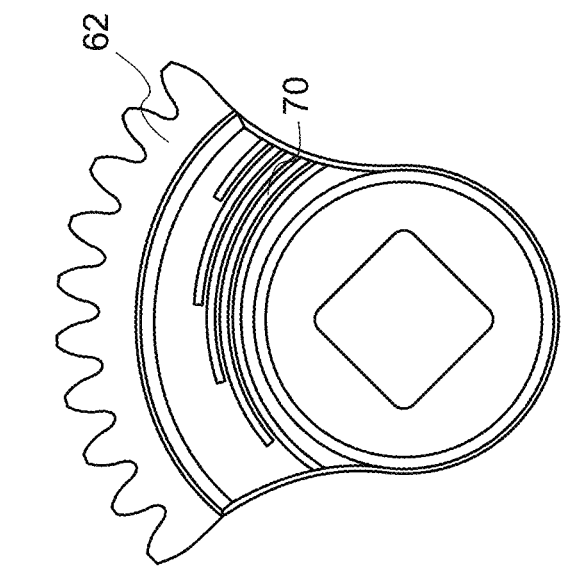

The 'bar code' 70, 70', 70" provided on the gear 62 for position indication can have many different formats or designs. What is important is that a characteristic of the code varies in the rotation direction of the gear 62. Some (non-limiting) examples are shown in FIGS. 3A to 3C. In the example of FIG. 3A, the code 70 comprises a number (here five, but other numbers are possible) of equally spaced bars or lines of different length (with respect to the direction of rotation). The number of bars detected by the reader 75 will be indicative of the position of the code relative to the fixe reader and, therefore, of the rotational position of the gear 62 and, so, the valve plate 30 relative to the port 20.

An alternative example bar code is shown in FIG. 3B, formed as a single bar 70' having varying thickness across the gear in the rotational direction, but the same principle applies.

In the example shown in FIG. 3C, multiple lines 70" of gradually varying length and varying spacing are provided. This latter design allows the position to be read with greater accuracy at certain angular positions e.g. it could be designed to have increased detail (and therefore accuracy) at angular positions close to the fully open and/or fully closed positions of the plate or at other particularly critical angular positions.

As mentioned above, the bar code reader or scanner 75 may be a known reader such as a CCD or laser scanner. These operate by emitting light (e.g. LED light or laser light) onto the bar code and capturing the reflected light. The lines or bars are read as binary digital signals by the reader detector (e.g. a charge coupled device, CCD, or laser photodetector). Reflections are strong in areas where there is no bar/line and weak in areas where a bar/line is present. The reflections are in the form of analog waveforms which are converted (by an A/D converter-ADC) to a digital (binary) signal. The digital signal can then be decoded to provide the position data. For each angular or rotational position of the plate shaft gear 62 (which will correspond to a rotational or angular position of the plate shaft 550 and, hence, of the plate 30), the reader will 'see' a different pattern of bars/lines and so the digital signal and the decoded signal will be different.

An example of position detection will be described with reference to FIGS. 4A to 4D.

In a first step (FIG. 4A), the plate 30 is in the open position relative to the port 20. At this position, the part of the bar code 70 aligned with, and read by the reader 75 has a particular shape—here all five lines are present. The resulting binary signal will be decoded as indicative of the fully open position.

In the next step (FIG. 4B), the plate 30 partially overlaps the port 20 (e.g. by around 30 degrees). At this position, the part of the bar code 70 aligned with the code reader 75 is different—here the reader only 'sees' three lines. This will be decoded as indicative of a 30 degree angular position.

As the plate 30 moves further over the port (FIG. 4C), the card reader 75 'sees' fewer lines of the bar code 70 and generates a resulting (say '60 degree' signal).

Figure 4A:
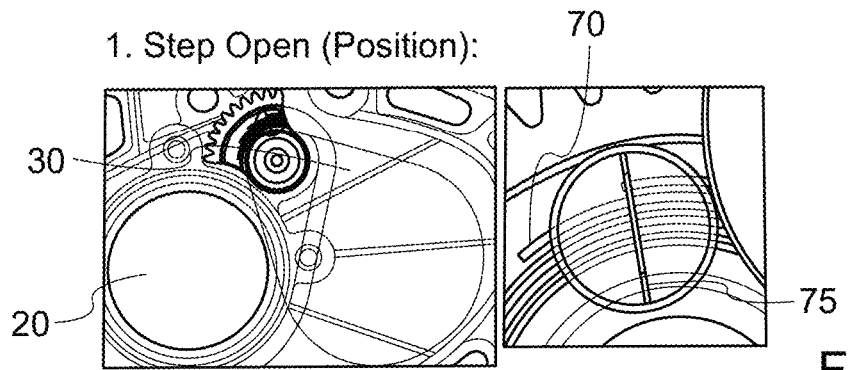
FIGS. 4A to 4D are shown to illustrate the operation of a position detection arrangement according to the disclosure.
Figure 4B:
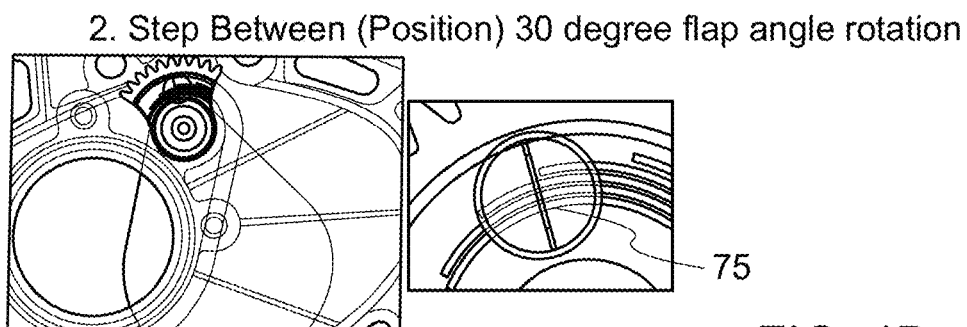
Figure 4C:
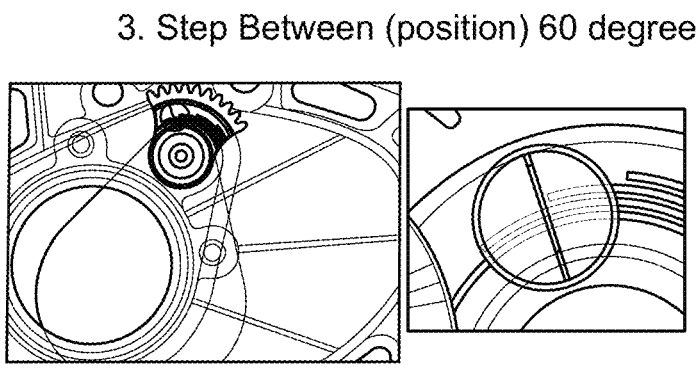
Figure 4D:
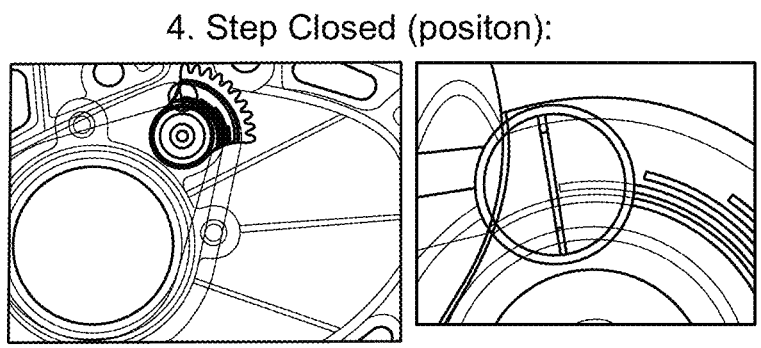

FIG. 4D shows the situation when the plate 30 fully overlaps the port 20—i.e. is fully closed and the corresponding bar code read by the reader 75 which will result in a decoded signal indicating 'closed'.

The 'bar code' position detection arrangement of this disclosure provides a simple, reliable and accurate way of detecting the position of the valve plate of a flush valve. No calibration or adjustment on assembly is required and the bar code can be selected according to the required accuracy/the need for variable accuracy across the range of motion of the plate.

The invention claimed is:
1. A flush valve comprising:
a valve housing defining a port; and
a valve plate arranged to rotate in a plane, relative to the port, such as to vary a degree of coverage of the port by the valve plate depending on the rotational position of the plate; the flush valve further comprising:
a component that rotates with the valve plate;

a code formed of gradated markings provided on the component, the gradated markings formed such that a characteristic of the code varies across the component in the rotation direction; and a code reader, fixed relative to the valve housing, and positioned to read the code as it passes the code reader on rotation of the valve plate.

2. The flush valve of claim 1, wherein the valve plate rotates relative to the valve port, about a pivot point, between an open position in which the valve plate does not cover the port, and a closed position in which the valve plate covers the port, and wherein the position of the code relative to the code reader is indicative of the rotational position of the valve plate relative to the port.

3. The flush valve of claim 1, further comprising a motor arranged to drive rotation of the valve plate.

4. The flush valve of claim 1, wherein the code is a bar code.

5. The flush valve of claim 1, wherein the code comprises a plurality of equally spaced bars of different lengths defined in the direction of rotation of the valve plate, such that the number of bars detected by the code reader is indicative of the valve plate position.

6. The flush valve of claim 1, wherein the code comprises a single bar having varying thickness in the direction of rotation of the plate valve, such that the thickness of the bar detected by the code reader is indicative of the valve plate position.

7. The flush valve of claim 1, wherein the code comprises a plurality of lines having varying length and varying spacing in the direction of rotation of the plate valve, such that the length and spacing of the lines detected by the code reader is indicative of the valve plate position.

8. The flush valve of claim 1, wherein the code reader is a charge coupled device, CCD, reader.

9. The flush valve of claim 1, wherein the code reader is a laser scanner.

10. The flush valve of claim 1, further comprising a handle for manual rotation of the valve plate.

11. The flush valve of claim 1, further comprising a drive shaft connected to the valve plate such that rotation of the drive shaft causes rotation of the valve plate, and wherein the component is attached to the drive shaft for rotation therewith.

12. The flush valve of claim 11, further comprising a gear mechanism between the drive shaft and the valve plate, the gear mechanism comprising a first gear fixed to and rotatable with the shaft, and a second gear, driven by the first gear, the second gear attached to and causing rotation of the valve plate, and wherein the component is the second gear.

13. The flush valve of claim 12, wherein the second gear is connected to the valve plate via a plate shaft.

14. A vacuum toilet system comprising a toilet bowl and a waste line via which waste from the toilet bowl is ejected, and the flush valve as claimed in claim 1, located between the toilet bowl and the waste line, such that the port provides fluid communication from the toilet bowl to the waste line.

* * * * *